J. DILL.

Improvement in Dovetailing-Machines.

No. 133,145. Patented Nov. 19, 1872.

WITNESSES.

Joseph Dill

By his Att'ys

UNITED STATES PATENT OFFICE.

JOSEPH DILL, OF BOSTON, MASSACHUSETTS.

IMPROVEMENT IN DOVETAILING-MACHINES.

Specification forming part of Letters Patent No. 133,145, dated November 19, 1872.

*To all whom it may concern:*

Be it known that I, JOSEPH DILL, of Boston, in the county of Suffolk and State of Massachusetts, have invented a certain Improvement in Dovetailing-Machines, of which the following is a specification:

In my invention a set of three saws is placed upon one arbor and adjusted into their proper places by means of peculiarly-shaped collars. The arbor also is adjusted so as to move in the frame. The two outside circular saws, when used in a dovetailing-machine, are inclined in the same direction. The inside or clearing saw is so placed upon the arbor as to extend from the edge of one outside saw to the opposite edge of the other outside saw. Another set of saws follows the set above described, and is arranged precisely the same, excepting that the angle of inclination is in the opposite direction, the two outside saws being parallel, as before. By means of the two sets, the angles of inclination of the arbors of which are set in opposite directions, a dovetail groove is made.

Figure 1:
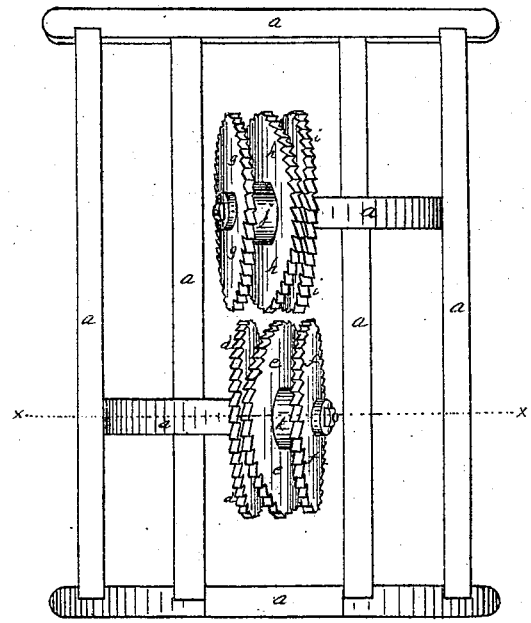
Figure 2:
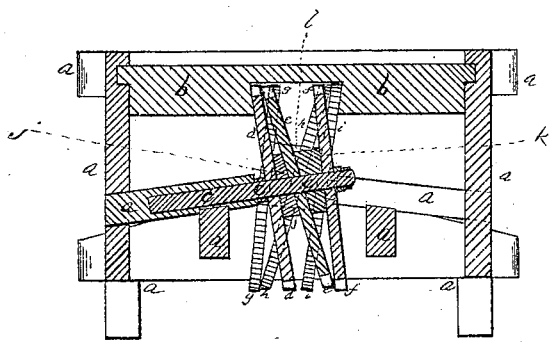

In the accompanying drawing, Figure 1 is a plan of two sets of saws set in a frame and embodying my invention. Fig. 2 is a cross-section cut in the direction of the line $x\ x$. The saws are represented as having cut a dovetail groove in a piece, shown in the figure.

Similar letters of reference indicate corresponding parts.

$a$ is a frame fitted up to hold the saws and to show their operation. $b$ represents a piece of wood which has been cut by the saws, shown in the drawing. $c$ represents one of the arbors, each of which sustains three saws. $d$ and $f$ represent the two outside parallel circular saws upon the arbor $c$. $e$ represents the inside or clearing saw, extending from one edge of $d$ to the opposite edge of $f$. These saws are kept in place by means of the collars $j\ k$. In placing the saws upon the arbor $c$, first is put on the saw $d$, then the collar $j$, then the saw $e$, then the collar $k$, then the saw $f$. The saws $g$, $h$, and $i$ are arranged upon their arbor in the same manner as the saws $d\ e\ f$, the angle being in the opposite direction. The saws which are above mentioned as outside saws, $d f g i$, project slightly further into the wood than the inside saws $e\ h$. It will be readily seen that the outside saws are the cutters, while the inside saws clear away the wood between the paths of the outside saws.

The advantage of three saws, placed as above described, over one saw alone, inclined so to form a dovetail groove, and then reversed so as to form the other side of the dovetail groove, is that the single saw is liable to spring, and hence not to form a straight line; while in the case of the three saws, the two outside saws cut the line and the inside saw merely clears out the stuff between the lines cut by the outside saws. Even if the inside saw should spring, which is hardly possible, it would not disturb the straight line cut by the outside saws. Of course, in order to cut a dovetail groove, the two sets are needed, as seen in Fig. 2. If the sets are placed in line, of course the width of the dovetail groove is the same as the distance across the three saws of either set. The width may be increased by drawing out the arbors and placing the sets of saws out of line. The largest dovetail groove made with two sets would be the width of the two sets added together. Of course the size of the dovetail groove could be indefinitely increased by adding more sets of saws. Of course the inside saws $h\ e$ are not perfectly round, but for the sake of convenience I call them circular saws.

With regard to the shape of the teeth of the saws, it is my aim to cause the whole of the cutting-edge of each tooth to perform its work and help cut the dovetail groove. If the edges of the teeth were at right angles with the side of the saw, but a corner only of each tooth would cut. The work performed would of course be scratchy and irregular. The teeth of these saws are so beveled as to make their cutting-edges parallel with the top of the dovetail groove. In the saws $e\ h$ no three teeth are alike. By these means I obtain a clean, straight dovetail groove, with an expenditure of the least possible power.

It is understood that my invention is for the purpose of cutting simply a dovetail groove. It is not intended to cut a simple square groove. To cut a dovetail groove both sets of saws are needed; therefore, I do not claim either of the sets of saws shown in the drawing, and designated by the letters *d e f g h i*, by itself, as either set singly would be useless for my purpose.

Having thus fully described my invention, what I claim, and desire to secure by Letters Patent, is—

The combination of the two sets of saws, *d e f* and *g h i*, when arranged upon inclined arbors, as and for the purpose shown and described.

JOSEPH DILL.

Witnesses:
HENRY W. WILLIAMS,
E. H. OBER.